(12) United States Patent
Subramoniam et al.

(10) Patent No.: US 6,642,876 B2
(45) Date of Patent: Nov. 4, 2003

(54) METHOD AND SYSTEM OF OPERATING A CODEC IN AN OPERATIONAL MODE

(75) Inventors: Krishnan Subramoniam, Austin, TX (US); Jens Puchert, Austin, TX (US); Brian K. Straup, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 10/206,424

(22) Filed: Jul. 26, 2002

(65) Prior Publication Data

US 2003/0067402 A1 Apr. 10, 2003

Related U.S. Application Data

(60) Provisional application No. 60/316,747, filed on Aug. 31, 2001.

(51) Int. Cl.[7] .............................................. H03H 1/66
(52) U.S. Cl. ........................ 341/144; 700/94; 381/119
(58) Field of Search ................................ 341/144, 155, 341/110; 700/94; 381/119, 104, 61

(56) References Cited

U.S. PATENT DOCUMENTS

| | | | | |
|---|---|---|---|---|
| 4,694,343 A | * | 9/1987 | Flora ........................... | 348/584 |
| 4,694,344 A | * | 9/1987 | Flora ........................... | 348/584 |
| 5,546,466 A | * | 8/1996 | Ishiguro et al. ............... | 381/61 |
| 6,218,971 B1 | * | 4/2001 | Sugihara ..................... | 341/110 |
| 6,259,957 B1 | * | 7/2001 | Alexander et al. ............ | 700/94 |
| 6,350,943 B1 | * | 2/2002 | Suruga et al. ................ | 84/603 |

* cited by examiner

*Primary Examiner*—Peguy Jeanpierre
(74) *Attorney, Agent, or Firm*—Steven Lin, Esq.

(57) ABSTRACT

A system and method of operating a codec in an operational mode are disclosed. The codec is operated in a digital centric mode. The digital centric mode involves the following: An analog mixer of the codec first mixes analog signals, if any, to produce a mixed analog signal. An analog-to-digital converter converts the mixed analog signal into a converted digital signal. A digital mixer mixes the converted digital signal with digital signals that are otherwise generally unavailable as analog signals to the codec without additional conversions to produce a mixed digital signal. A digital-to-analog converter converts the mixed digital signal into a mixed analog signal. A digital processor may perform digital effects processing on the mixed digital signal to add digital effects to the mixed digital signal. The codec is still able to alternatively operate in an analog centric mode, a host processing mode, or a multi-channel mode.

17 Claims, 9 Drawing Sheets

METHOD AND SYSTEM OF OPERATING A CODEC IN AN OPERATIONAL MODE

RELATED APPLICATION

The present application claims the benefit of U.S. provisional application No. 60/316,747 filed by inventors Krishnan Subramoniam, Jens Puchert, and Brian K. Straup on Aug. 31, 2001 entitled "Digital Centric Architecture for AC 97 Codecs" (Cirrus Docket No. 1176-CA-PROV).

BACKGROUND OF THE INVENTION

1. Field of the Invention

The present invention relates to a coder/decoder ("codec"), and, more particularly, to providing and operating a codec in a particular operational mode. More specifically, the present invention relates to operating a codec in a digital centric mode.

2. Description of Related Art

A coder/decoder("codec") is considered to be any technology that encodes or decodes a signal. For example, telephone companies use codecs to convert binary signals transmitted on their digital networks to analog signals converted on their analog networks.

Also, an exemplary type of audio codec is the audio codec ("AC") '97, which Intel Corporation has published in various revisions of the specification entitled *Audio Codec '97* ("*AC '97*") (e.g., revision 2.2 in September 2000; revision 2.1 in May 22, 1998; revision 2.0 in Sep. 29, 1997; revision 1.03 in Sep. 15, 1996). The AC '97 specification and its various revisions are hereby incorporated by reference.

The AC '97 specification, revision 1.03 comprehensively defines a serial codec device that is designed to be used in systems in which audio signal processing and audio analog-to-digital (A/D) and digital-to-analog (D/A) conversions are performed in separate devices. The AC '97 specification, revision 2.0 is a follow-up revision to revision 1.03 and further defines the interface for a combined audio/telephony codec. Revision 2.0 also includes definitions for modem sample rate control, tagged data exchange using different sampling rates, general purpose input/output definitions, and extended AC-link definitions for multiple devices and power management event handling. Revision 2.1 updates revisions 1.03 and 2.0 by including some electrical and power management updates. Revision 2.2 provides further updates to revision 2.1 by adding optional S/PDIF support, standardized slot re-mapping, and updated electrical specification for better riser support.

An AC '97 codec typically processes signals by first mixing the digital signals. The mixed digital output signal is then converted into a converted analog signal. The converted analog signal is then mixed with other analog signals. The AC '97 codec provides a mixed analog output signal. However, in some applications, the AC '97 receives and processes digital signals that otherwise are unavailable as analog signals unless further conversions are performed.

For example, the AC '97 codec may be utilized in an audio card of a notebook computer. The AC '97 codec may receive digital signals from a docking station in which the digital signals were originally converted from analog signals of analog sources at the docking station. The digital signals are generally unavailable as analog signals to the AC '97 codec unless further conversions are otherwise performed. If conversions are performed, then digital-to-analog converters (DACs) must be additionally utilized. The use of additional DACs adds to the overall size and cost of the audio circuit, and the DACs further processing the signals may add to the overall noise and distortion of the processed signals. Also, the opportunity for the AC '97 codec to in effect add any digital effects to the analog signals that otherwise would not have digital effects is lost since the process steps for the AC '97 codec is to initially mix the digital signals, convert the mixed digital signal into an analog signal, and then mix the analog signals.

As another example, the AC '97 codec may be utilized in a set-top box for processing audio signals. The set-top box has a circuit in which a portion of the circuit only handles, processes, and/or generates digital audio signals. If the AC '97 codec were to receive the digital audio signals, then additional DACs need to be utilized to convert the digital signals to analog signals. Otherwise, the digital signals are unavailable as analog signals to the AC '97 codec unless further conversions are performed. Again, DACs add to the overall size and cost of the audio circuit for the set-top box and add to the overall noise and distortion of the processed signals. Also, the opportunity for the AC '97 codec to in effect add any digital effects to the analog signals that otherwise do not have the digital effects is lost since the process steps for the AC '97 codec is to initially mix the digital signals, convert the mixed digital signal into an analog signal, and then mix the analog signals.

According to the current method as to how an audio codec processes signals, the audio codec cannot in effect add digital effects to the analog signals. Since the digital effects are missing from the analog signals, then the output of the audio codec does not entirely reflect what is being recorded or played back when digital effects have been added to the digital signals and, in effect, to the analog signals as well.

The present invention recognizes the desire and need for a codec to receive and process digital signals, which relate to the audio source signals without having to perform any additional conversions. The present invention further recognizes the desire and need to avoid the use of additional DACs, which would otherwise add to the overall size, cost, noise and distortion of an audio circuit. The present invention also recognizes the desire and need for the codec to be able to add digital effects to the analog signals that would otherwise not have the digital effects so that the output reflects what is being recorded or played back when digital effects have been added to the digital signals and, in effect, to the analog signals as well. The present invention overcomes the problems and disadvantages that have been encountered with the prior art.

SUMMARY OF THE INVENTION

A system and method of operating a codec in an operational mode are disclosed. The codec is operated in a digital centric mode. Operation in the digital centric mode involves the following: An analog mixer of the codes first mixes analog signals, if any, to produce a mixed analog signal. An analog-to-digital converter converts the mixed analog signal into a converted digital signal. A digital mixer mixes the converted digital signal with digital signals that are otherwise generally unavailable as analog signals to the codec unless further conversions are performed to produce a mixed digital signal. A digital-to-analog converter converts the mixed digital signal into a mixed analog signal. A digital processor may perform digital effects processing on the mixed digital signal to add digital effects to the mixed digital signal. The codec is still able to alternatively operate in an analog centric mode, a host processing mode, or a multi-channel mode.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

The present invention is a system and method of operating a codec in a digital centric mode. The present invention also allows the codec to alternatively operate in an analog centric mode, a host processing mode, or a multi-channel mode. The following specification discloses the implementation of the present invention in terms of an exemplary audio codec according to the AC '97 codec specification or standard. As stated earlier, the AC '97 specification is a published and well-known standard, and the AC '97 specification and its various revisions are hereby incorporated by reference. However, even though the present invention is disclosed in terms of implementation in an exemplary audio codec according to the AC '97 specification, the present system and method are not in any way limited to just being utilized in a particular audio codes but may be implemented in any type of or suitable codec (including video codecs).

Figure 1:
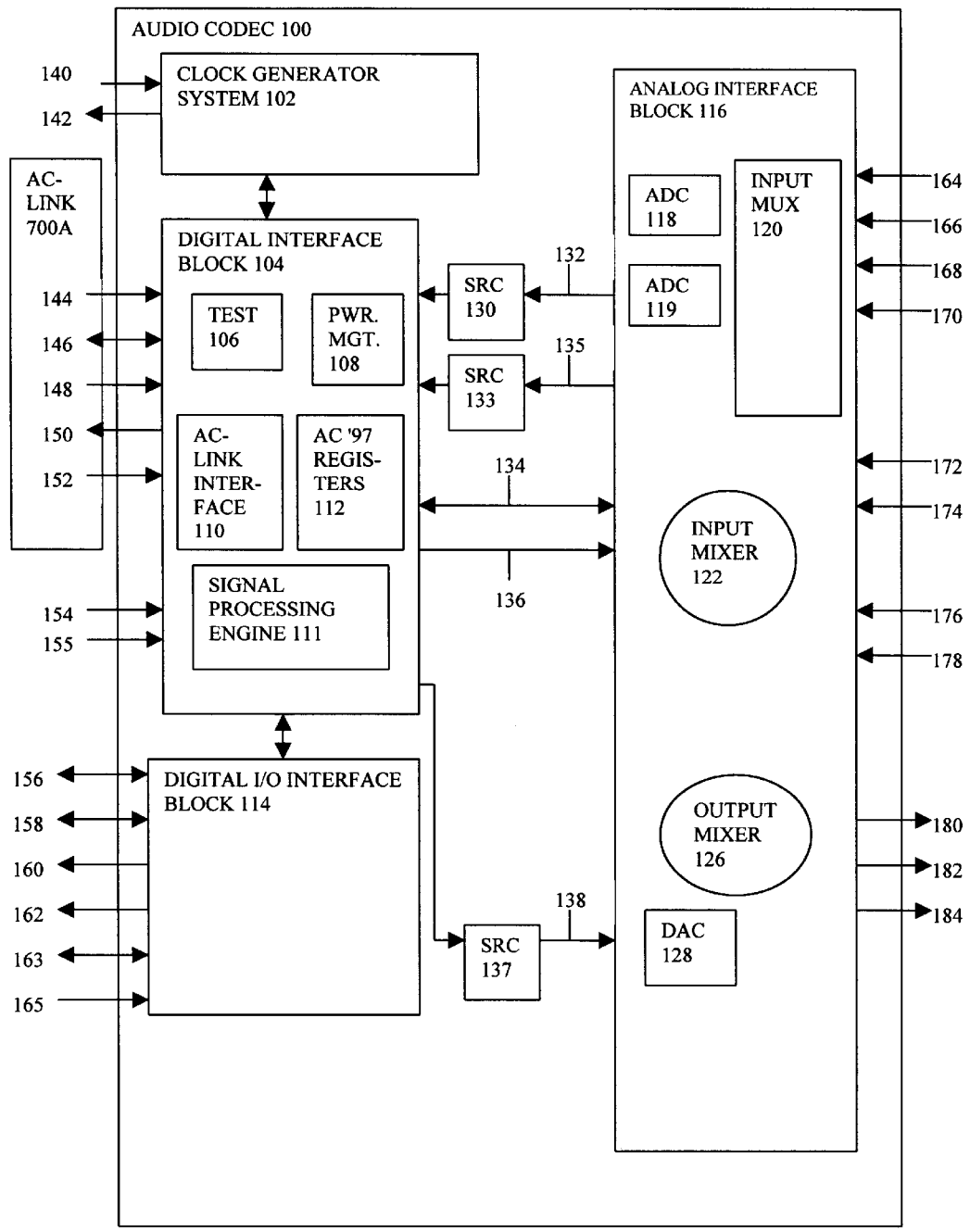
FIG. 1 is an exemplary block diagram of a codec that operates in an operational mode according to the present invention.

With reference now to FIG. 1, an exemplary audio codec 100 according to the AC '97 specification is shown. Audio codec 100 has a clock generator system 102. Audio codec 100 also has a crystal input ("XTL_IN") pin 140 and a crystal output ("XTL_OUT") pin 142. Clock generator system 102 interfaces and communicates with XTL_IN and XTL_OUT pins 140 and 142. XTL_IN pin 140 accepts either a clock generator oscillator, such as an external CMOS clock, or a crystal oscillator as the clock source for driving and operating audio codec 100. If a crystal oscillator drives audio codec 100, then the crystal oscillator is coupled between XTL_IN pin 140 and XTL_OUT pin 142. However, if a clock generator oscillator drives audio codec 100, then clock generator oscillator drives XTL_IN pin 140. In this case, XTL_OUT pin 142 is not connected to any component or device and is left floating.

Figure 7A:
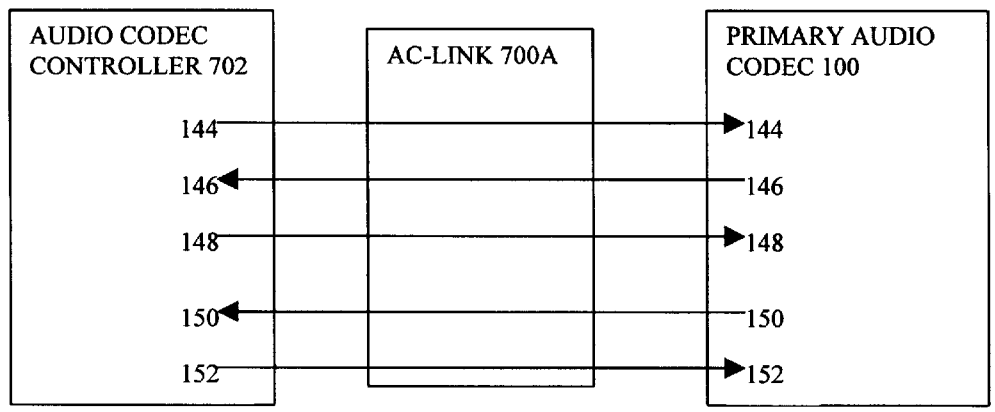
FIG. 7A is an exemplary block diagram of a single codec of FIG. 1 configured to operate in a primary or master mode and linked to a controller.
Figure 7B:
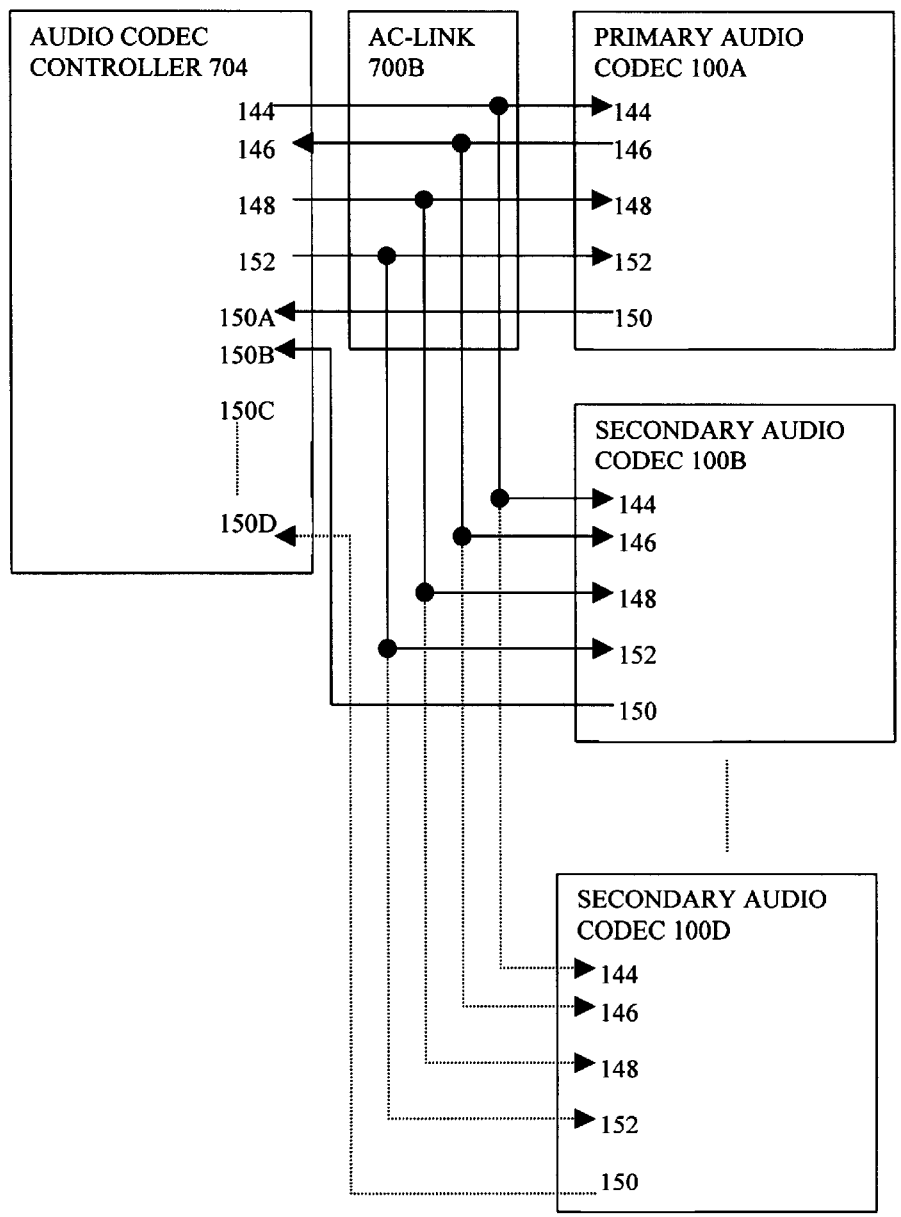
FIG. 7B is another exemplary block diagram of multiple codecs of FIG. 1 in which one of the codecs is configured to operate in a primary or master mode and the other codecs are configured to operate in the secondary or slave modes and in which the multiple codecs are linked to a controller.

Clock generator system 102 is coupled to a digital interface block 104. Digital interface block 104 contains a test block 106 that provides the specific device test functions for design verification and debug of audio codec 100 into a silicon design. Test block 106 also provides the test circuitry required for production testing and manufacturing stages of audio codec 100. Digital interface block 104 also has a power management control block 108 utilized for managing power usage by audio codec 100. Digital interface block 104 also includes an audio codec link ("AC-link") interface block 110 and an AC '97 registers block 112. AC '97 registers block 112 contains various registers defined by the AC '97 specification and standard. AC-link interface block 110 couples to an AC-link 700A. AC-link 700A is a point-to-point link between audio codec 100 and audio codec controller 702 or 704 as shown in FIGS. 7A and 7B. Audio codec controller 702 or 704 controls operations of audio codec 100. Digital interface block 104 also has a signal processing engine 111 for processing digital signals which audio codec 100 receives.

AC-link 700A includes a serial port sync pulse input ("SYNC") pin 144, a serial port master clock input/output ("BIT_CLK") pin 146, a serial data input stream to audio codes input ("SDATA_OUT") pin 148, a serial data output stream from audio codec output ("SDATA_IN") pin 150, and a reset input ("RESET#") pin 152. SYNC pin 144 provides the serial port timing signal for audio codec 100. BIT_CLK pin 146 provides the input/output signal, which controls the master clock timing for AC-link 700A. SDATA_OUT pin 148 provides the input signal that is transmitted to control information and digital audio output streams which are sent to the digital-to-analog converters ("DACs") of DAC block 128. The data is clocked into audio codec 100 on the falling edge of the BIT_CLK signal. SDATA_IN pin 150 provides the output signal that transmits the status information and digital audio input streams from the analog-to-digital converters ("ADCs") of ADC block 118. The data is clocked from audio codec 100 on the rising edge of the BIT_CLK signal. RESET# pin 152 resets audio codec 100 before entering into the normal operational mode.

Audio codec 100 also has an identification ("ID0#") pin 154 and another identification ("ID1#") pin 155, which interface with digital interface block 104. Values assigned to ID0# and ID1# pins 154 and 155 and a value assigned to a clock present signal may be utilized to determine the mode of operation (e.g., primary/master mode or secondary/slave mode) of audio codec 100 and the clock source for providing the clock signal with the desired clock rate to audio codec 100.

Digital interface block 104 is coupled to a digital input/output ("I/O") interface block 114. Digital I/O interface block 114 digitally interfaces with input and output devices through I/O pins such as the following exemplary pins: a general purpose I/O or left-right clock I/O ("GPIO0/LRCLK") pin 156, a general purpose I/O or serial data output I/O ("GPIO1/SDOUT") pin 158, an external amplifier power down or serial clock output ("EAPD/SCLK") pin 160, a Sony/Phillips Digital Interface Output or Serial Data Output 2 output ("SPDO/SDO2") pin 162, a general purpose I/O or serial data input ("GPIO[2:4]/SDI[1:3]") pins 163, and a ZV Input Port Left-Right Clock/ZV Input Port Serial Data/ZV Input Serial Clock ("ZLRCLK, ZSDATA, ZSCLK") pins 165.

GPIO0/LRCLK pin 156 is a general purpose I/O pin that is utilized to interface with external circuitry. GPIO0/LRCLK pin 156 also provides the left-right ("L/R") clock for both serial data ports under certain conditions. GPIO1/SDOUT pin 158 is another general purpose I/O pin that is also used to interface with external circuitry. GPIO1/SDOUT pin 158 also provides the serial data for the first serial data port under certain conditions. EAPD/SCLK pin 160 is used to control the power-down state of an external amplifier. EAPD/SCLK pin 160 also provides the serial clock for both serial data ports. SPDO/SDO2 pin 162 generates the digital output for the Sony/Phillips digital interface output ("S/PDIF") from audio codec 100 under certain conditions. SPDO/SDO2 pin 162 also provides the serial data for the second serial data port under certain conditions. GPIO[2:4]/SDI[1:3] pins 163 consists of the following pins: a general purpose I/O "2" or serial data input "1"("GPIO2/SDI1") pin, a general purpose I/O "3" or serial data input "2"("GPIO3/SDI2") pin, and a general purpose I/O "4" or serial data input "3"("GPIO4/SDI3") pin. All of the GPIO pins may be used to interface with various external circuitry. When a GPIO pin is configured as an input pin, then the GPIO pin may operate as a Schmitt triggered input. When a GPIO pin is configured as an output pin, then the GPIO pin may function as a normal CMOS output or an open drain output. When the GPIO2/SDI1, GPIO3/SDI2, GPIO4/SDI3 pins operate as serial data input pins, then these pins respectively receive the serial data for the first, second, and third serial data ports under certain conditions.

Digital I/O interface block 114 is utilized to connect audio codec 100 to consumer electronic equipment and devices. Digital I/O interface block 114 contains a serial port that is utilized to interface audio codec 100 with one or two external stereo digital-to-analog converters ("DACs").

An analog interface block 116 is coupled to digital interface block 104. Gain and/or mute control signals 134 and mixer and/or multiplexer ("mux") select signals 136 are communicated between digital interface block 104 and analog interface block 116. Data 132 is transmitted from analog interface block 116 to digital interface block 104, and microphone signal data 135 is transmitted from analog interface block 116 to digital interface block 104. Data 138 is transmitted from digital interface block 104 to analog interface block 116. The SRC system includes a sample rate converter ("SRC") 130 coupled in the data transmission path after the ADCs of ADC block 118 in analog interface block 116 for providing the sample rate of sampling data 132 from ADC block 118. The SRC system also includes a second SRC 133 coupled in the microphone signal transmission path after the ADCs of ADC block 119 in analog interface block 116 for providing the sample rate of sampling microphone signal data 135 from ADC block 119. The SRC system further includes a third SRC 137 coupled in the data transmission path before the DACs of DAC block 128 for providing the sample rate for sampling data 138 to the DACs.

Analog interface block 116 contains the analog circuitry for providing the audio functions of audio codec 100. Analog interface block 116 includes ADC block 118, ADC block 119, an input multiplexer ("MUX") 120, an input mixer 122, an analog output mixer 126, and a DAC block 128. Analog interface block 116 is coupled to and interfaces with various pins such as the following exemplary pins: line input ("LINE") pins 164, compact disk ("CD") audio input pins 166, auxiliary ("AUX") input pins 168, video ("VIDEO") audio input pins 170, a primary microphone ("MIC1") pin 172, a secondary microphone ("MIC2") pin 174, a speakerphone input ("PHONE") input pin 176, a personal computer beep speaker input ("PC_BEEP") pin 178, line level output ("LINE_OUT") pins 180, headphone output ("HP_OUT") pins 182, and a speakerphone output ("MONO_OUT") pin 184.

LINE pins 164 receive analog inputs, which provide a pair or stereophonic sources to analog input mixer 122 and may be used for an auxiliary external audio source. CD audio input pins 166 receive analog inputs that also provide a pair or stereophonic sources to analog input mixer 122 and may be used for a CD audio source. AUX input pins 168 receive analog inputs that are a pair or stereophonic sources to analog input mixer 122 and may be used for an auxiliary internal or external audio source. VIDEO audio input pins 170 receive analog inputs that are a pair or stereophonic sources to analog input mixer 122 and may be used for the audio signal output of a video device.

MIC1 pin 172 receives an analog input that is a monophonic source to analog input mixer 122 and may be used for a desktop microphone. MIC2 pin 174 receives an analog input that is a monophonic source to analog input mixer 122 and may be used for a headset or alternate microphone. The signals from MIC1 pin 172 and MIC2 pin 174 are the signals generated for the microphone signal transmission path. PHONE pin 176 receives an analog input that is a monophonic source to analog input mixer 122 and may be used for the audio signal output of a telephony device. PC_BEEP pin 178 receives the analog input that is intended to pass the Power On Self-Test ("POST") tones of a personal computer to the audio subsystem. LINE_OUT pins 180 provides the analog line output signals from stereo output mixer 126. HP_OUT pins 182 outputs the analog headphone output signals from stereo output mixer 126. MONO_OUT pin 184 provides the analog output signal from the stereo-to-mono mixer 126.

Figure 2:
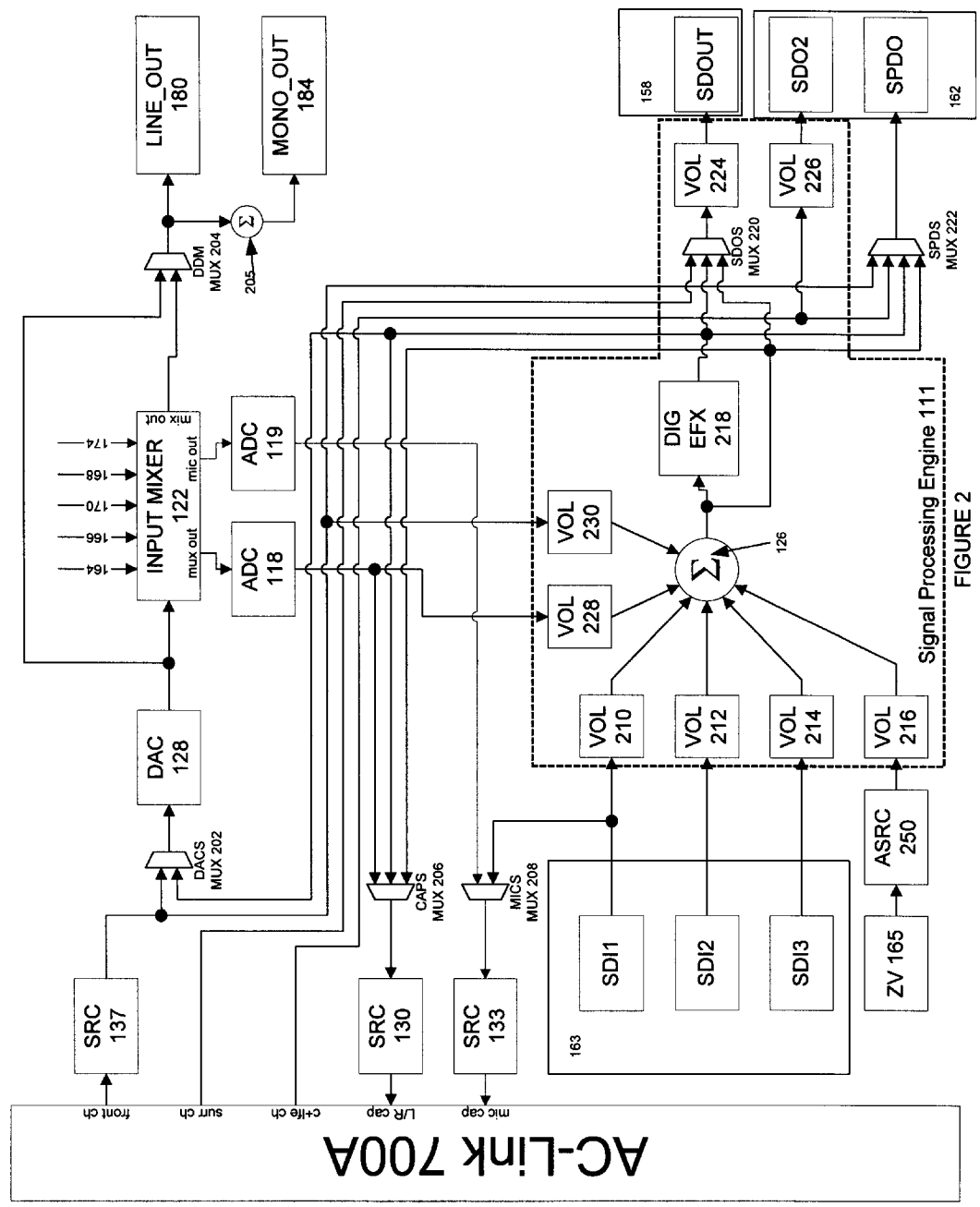
FIG. 2 is an exemplary block diagram of an overall view of the digital signal routing for the codec of FIG. 1 according to the present invention.

Referring now to FIG. 2, an overall, block diagram view of the digital routing for audio codec 100 according to the present invention is shown. FIG. 2 shows AC-link 700A. AC-link 700A includes a front channel ("Front Ch"), a stereo surround sound channel ("Surr Ch"), a c+lfe channel ("Center+LFE CH"), left/right capture ("L/R Cap"), and a microphone capture ("Mic Cap"). SRC 137 is coupled to Front Ch of AC-link 700A. The output of SRC 137 is fed into an input of a digital-to-analog converters multiplexer ("DACS MUX") 202 and an input of a Sony/Phillips Digital Interface Source multiplexer ("SPDS MUX") 222. Another input of DACS MUX 202 receives the output signal from digital effects processor ("DIG EFX") 218. DACS MUX 202 selects between the digital signal from either SRC 137 or DIG EFX 218. The output from DACS MUX 202 is fed into the input of DAC 128. DAC 128 converts the selected digital signal to a respective analog signal. The analog signal output from DAC 128 may be fed into input mixer 122. Input mixer 122 mixes the analog signal output with signals from LINE pins 164, CD audio input pins 166, AUX input pins 168, VIDEO audio input pins 170, and a primary microphone ("MIC1") pin 172. Alternatively, the analog signal output may by-pass input mixer 122 and be fed directly into DAC direct mode multiplexer ("DDM MUX") 204. The output of input mixer 122 is also fed into DDM MUX 204. The output of DDM MUX 204 is fed into LINE_OUT pins 180 and to a left and right summing stage 205 (e.g., stereo-to-mono mixer 205), which creates the mono signal. The output of summing stage 205 is, in turn, fed into MONO_OUT pin 184.

Data output signal (through "Mux Out") from input mixer 122 is directed into ADC block 118, and microphone data output signal (through "Mic Out") from input mixer 122 is fed into ADC block 119. ADC block 119 operates at any supported rate. For example, ADC block 119 may operate at half (½) of the sampling rate of ADC block 118. ADC blocks 118 and 119 convert the respective analog signals into converted digital signals. The output of ADC block 118 is fed into a volume amplifier ("VOL") 228 in signal processing engine 111 and into one of the inputs of a capture source multiplexer ("CAPS MUX") 206. Another input of CAPS MUX 206 receives the signal from the DIG EFX 218, and a further input of CAPS MUX 206 receives a signal from output mixer 126. CAPS MUX 206 is controlled to select between the output of ADC block 118, the signal from DIG EFX 218, and the signal from output mixer 126 as the digital signal to be sample rate converted by SRC 130. The output of CAPS MUX 206 is directed into the input of SRC 130. SRC 130 sample-rate converts the selected digital signal, and the sample-rate-converted output of SRC 130 is fed into L/R Cap of AC-link 700A.

The output of ADC block 119 is fed into an input of a microphone source multiplexer ("MICS MUX") 208. The output signal from SDI1 pin, which may be $I^2S$ IN1 among GPIO[2:4]/SDI[1:3] pins 163, is fed into another input of MICS MUX 208. MICS MUX 208 is controlled to select between the signal from SDI1 pin and the output signal from ADC block 119 as the signal to be sample rate converted by SRC 133. The sample-rate converted output of SRC 133 is fed into Mic Cap of AC-link 700A.

Serial data input SDI1, SDI2, and SDI3 pins, which may be $I^2S$ IN1, $I^2S$ IN2, and $I^2S$ IN3 pins, among GPIO[2:4]/SDI[1:3] pins 163, are fed into respective volume amplifiers ("VOLs") 210, 212, and 214 of signal processing engine 111. Also, ZV input port 165 is coupled to an asynchronous sample rate converter ("ASRC") 250 to asynchronously sample rate convert the signal from ZV input port 165 to a different rate. The output of ASRC 250 is fed into volume amplifier ("VOL") 216. The outputs from VOLs 210, 212, 214, 216, 228, and 230 are fed into output mixer 126 and mixed thereat. Output mixer 126 provides a digitally mixed output signal, and the digitally mixed output signal is directed into a digital effects processor ("DIG EFX") 218. DIG EFX 218 processes the digitally mixed output signal to add digital effects thereto. Alternatively, the digitally mixed output signal may by-pass DIG EFX 218 and be fed directly into serial data output source multiplexer ("SDOS MUX") 220. Also, the output of DIG EFX 218 is fed into SDOS MUX 220. As stated earlier, another input of SDOS MUX 220 is received from the output of Surround Channel. SDOS MUX 220 selects among the output of Surround Channel, the digitally mixed output signal, and the output of DIG EFX 218 as the signal to output to volume amplifier ("VOL") 224. VOL 224, in turn, provides an amplified output signal to SDOUT pin 158, which may be an $I^2S$ OUT1 pin. Volume amplifier ("VOL") 226 receives the signal from C+LFE CH. The amplified signal from VOL 226 is directed to pin 162 when pin 162 is configured to operate as the serial data output pin (e.g., SDO2 pin 162, which may be an $I^2S$ OUT2 pin). SPDS MUX 222 receives inputs from the output of SRC 137, the signal from C+LFE CH, the output of DIG EFX 218, and the output of output mixer 126. SPDS MUX 222 selects among these signals as the signal to output to pin 162 when pin 162 is configured as a Sony/Phillips digital interface output pin (e.g., SPDO or S/PDIF OUT pin 162).

Figure 3:
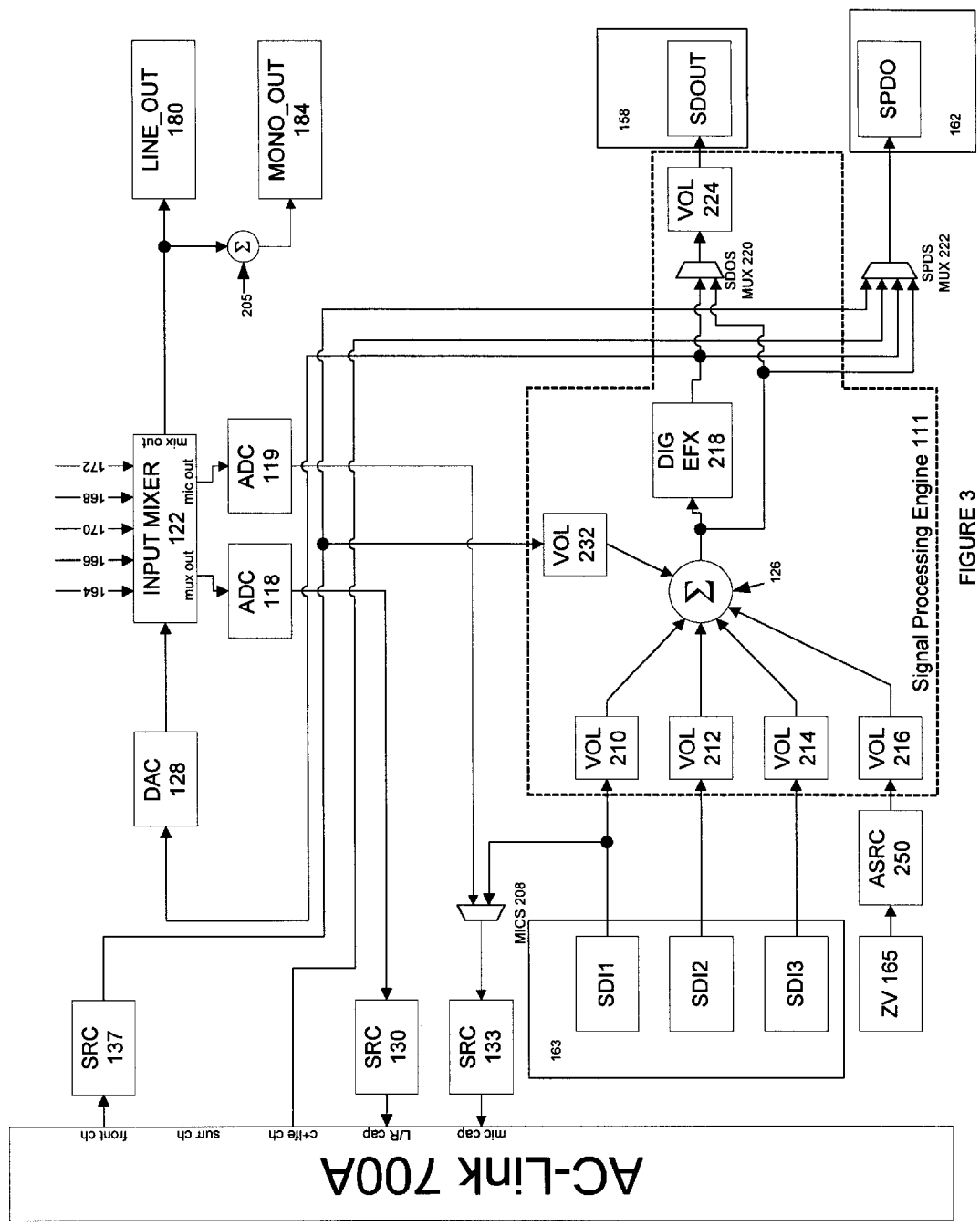
FIG. 3 is an exemplary block diagram of the digital signal routing for the codec of FIG. 1 according to the present invention operating in the analog centric mode.

With reference now to FIG. 3, an exemplary block diagram of the digital signal routing for audio codec 100 operating in the analog centric mode is shown. Digital output mixer 126 pre-mixes the digital signals from serial data input SDI1, SDI2, and SDI3 pins (e.g., $I^2S$ IN1, $I^2S$ IN2, $I^2S$ IN3 pins), ZV input port 165 via ASRC 250, and SRC 137 transmitted through respective VOLs 210, 212, 214, 216, and 230. These digital signals are otherwise generally unavailable as analog signals to audio codec 100 unless additional conversions are performed. Output mixer 126 outputs a pre-mixed digital signal. DIG EFX 218 processes the pre-mixed digital signal to add digital effects thereto. DAC 128 converts the pre-mixed digital signal with digital effects into a converted analog signal, which is fed into input mixer 122. Input mixer 122 receives and mixes the converted analog signal with signals from LINE pins 164, CD audio input pins 166, AUX input pins 168, VIDEO audio input pins 170, and a primary microphone ("MIC1") pin 172. The analog output of input mixer 122 is fed into LINE_OUT pins 180 and into a summing stage 205. The output of summing stage 205 is, in turn, fed into MONO_OUT pin 184.

Data output signal (e.g., through "Mux Out") from input mixer 122 is directed into ADC block 118, and microphone data output signal (e.g., through "Mic Out") from input mixer 122 is fed into ADC block 119. ADC blocks 118 and 119 convert the respective analog signals into converted digital signals. The output of ADC block 118 is fed into SRC 130 (via selection by CAPS MUX 206 of FIG. 2). SRC 130 sample-rate converts the output of ADC block 118 into a sample-rate converted output signal, and the sample-rate-converted output of SRC 130 is fed into L/R Cap of AC-link 700A.

The output of ADC block 119 is fed into an input of MICS MUX 208. The output signal from SDI1 pin is fed into another input of MICS MUX 208. MICS MUX 208 is controlled to select between the signal from SDI1 pin and the output signal from ADC block 119 as the signal to be sample rate converted by SRC 133. The sample-rate converted output of SRC 133 is fed into Mic Cap of AC-link 700A.

SDOS MUX 220 receives the output of digital output mixer 126 (e.g., the pre-mixed digital signal) and the output of DIG EFX 218 (e.g., the pre-mixed digital signal with digital effects). SDOS MUX 220 selects among the output of DIG EFX 218 and the output of digital output mixer 126 as the signal to output to volume amplifier ("VOL") 224. VOL 224, in turn, provides an amplified output signal to SDOUT pin 158. SPDS MUX 222 receives inputs from the output of SRC 137, the signal from C+LFE CH, the output of DIG EFX 218, and the output of digital output mixer 126. SPDS MUX 222 selects among these signals as the signal to output to pin 162 when pin 162 is configured as an SPDO or S/PDIF OUT pin.

However, since the digital signals are pre-mixed by digital output mixer 126 in the analog centric mode, digital effects cannot, in effect, be added to the analog signals that are later mixed together (e.g., no "digital effects" for the analog signals from LINE pins 164, CD audio input pins 166, AUX input pins 168, VIDEO audio input pins 170, and a primary microphone ("MIC1") pin 172). In other words, the output of input mixer 122 may not reflect what is being recorded since digital effects that exist for the pre-mixed digital signal are not, in effect, available for or added to the analog signals.

Figure 4:
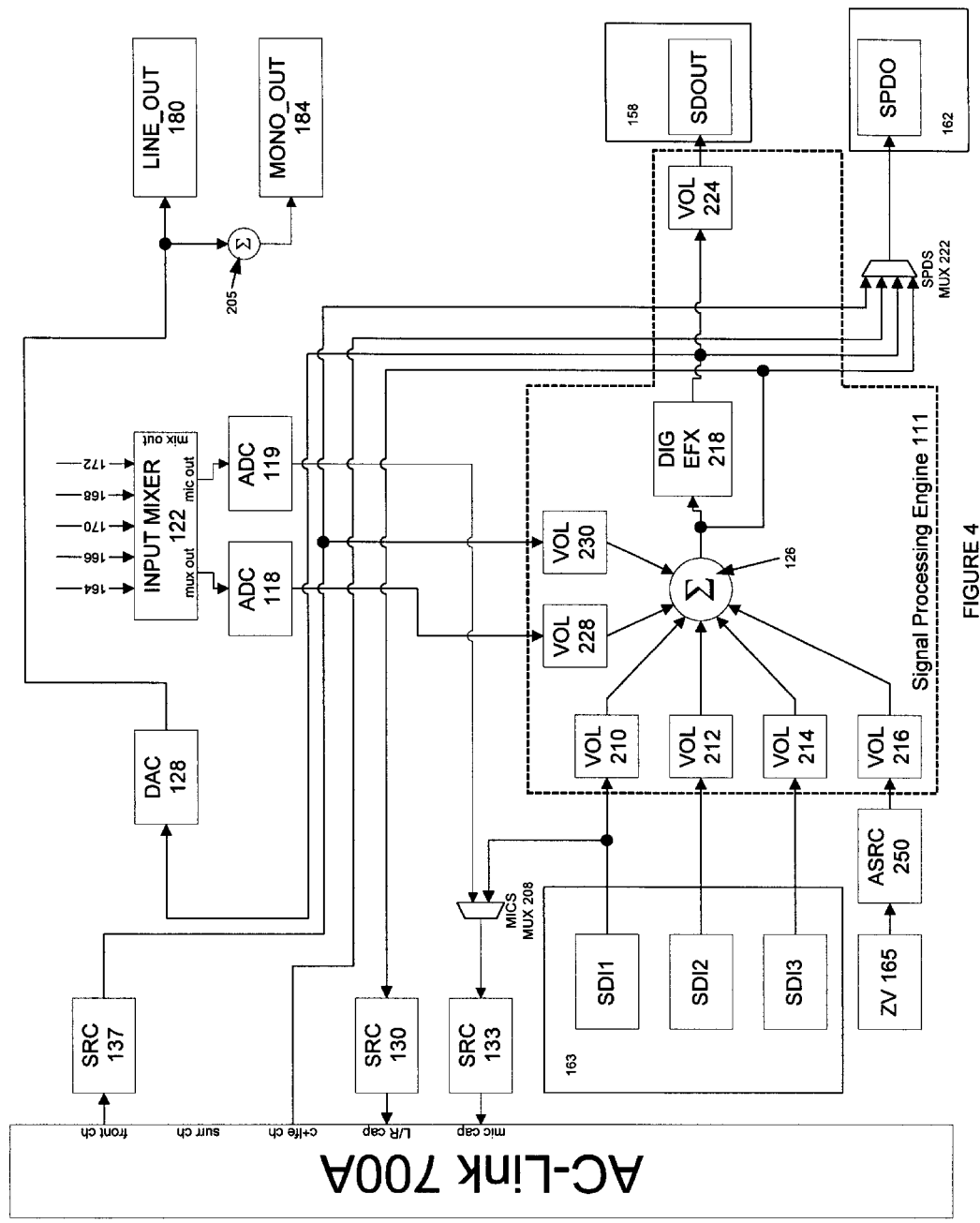
FIG. 4 is an exemplary block diagram of the digital signal routing for the codec of FIG. 1 according to the present invention operating in the digital centric mode.

Referring now to FIG. 4, an exemplary block diagram of the digital signal routing for audio codec 100 operating in the digital centric mode is shown. Input mixer 122 first mixes together analog signals from LINE pins 164, CD audio input pins 166, AUX input pins 168, VIDEO audio input pins 170, and a primary microphone ("MIC1") pin 172. Input mixer 122 outputs a mixed analog signal (as the data output signal) through Mux Out. The mixed analog signal is fed into ADC block 118, which converts the mixed analog signal to a converted digital signal. The converted digital signal is fed into VOL 228. Digital output mixer 126 mixes the signals from serial data input SDI1, SDI2, and SDI3 pins, ZV input port 165 via ASRC 250, ADC block 118, and SRC 137 transmitted through respective VOLs 210, 212, 214, 216, 228 and 230. These digital signals are otherwise generally unavailable as analog signals to the codec unless additional conversions are performed. Output mixer 126 outputs a mixed digital signal. DIG EFX 218 processes the mixed digital signal to add digital effects thereto.

The output of DIG EFX 218 is directed into DAC 128, which converts the digital signal with digital effects into an analog signal, which, in effect, has the digital effects. The output of DAC 128 by-passes input mixer 122 and is directly input into LINE_OUT pins 180 and into a summing stage 205 (e.g., DDM MUX 204 selects the output of DAC 128 in the DAC direct mode). The output of summing stage 205 is, in turn, fed into MONO_OUT pin 184. The output of DIG EFX 218 is also fed into volume amplifier ("VOL") 224 (via selection of SDOS 220 of FIG. 2). VOL 224, in turn, provides an amplified output signal to SDOUT pin 158. SPDS MUX 222 receives inputs from the output of SRC 137, the signal from C+LFE CH, the output of DIG EFX 218, and the output of digital output mixer 126. SPDS MUX 222 selects among these signals as the signal to output to pin 162 when pin 162 is configured as a SPDO or S/PDIF OUT pin.

The output of digital output mixer 126 is also fed into SRC 130 (via selection of CAPS MUX 206 of FIG. 2). SRC 130 sample-rate converts the output of digital output mixer 126 into a sample-rate converted output signal, and the sample-rate-converted output of SRC 130 is fed into L/R Cap of AC-link 700A. Microphone data output signal (e.g., through "Mic Out") from input mixer 122 is fed into ADC block 119. ADC block 119 converts the analog signal into a respective converted digital signal. The output of ADC block 119 is fed into an input of MICS MUX 208. The output signal from SDI1 pin is fed into another input of MICS MUX 208. MICS MUX 208 is controlled to select between the signal from SDI1 pin and the output signal from ADC block 119 as the signal to be sample rate converted by SRC 133. The sample-rate converted output of SRC 133 is fed into Mic Cap of AC-link 700A.

In the digital centric mode, digital effects are, in effect, able to be added to the analog signals (e.g., to the analog signals from LINE pins 164, CD audio input pins 166, AUX input pins 168, VIDEO audio input pins 170, and a primary microphone ("MIC1") pin 172). These analog signals would not otherwise have these digital effects in the analog centric mode since the process steps for the AC '97 codec is to initially mix the digital signals, convert the mixed digital signal into an analog signal, and then mix the analog signals.

The output of input mixer 122 reflects what is being recorded since digital effects that exist for the mixed digital signal are, in effect, available and exist for the analog signals. Also, the digital signals that are otherwise generally unavailable as analog signals to audio codec 100 unless further conversions are performed are processed (e.g., mixed and added with digital effects) by audio codec 100 without further conversions.

Figure 5:
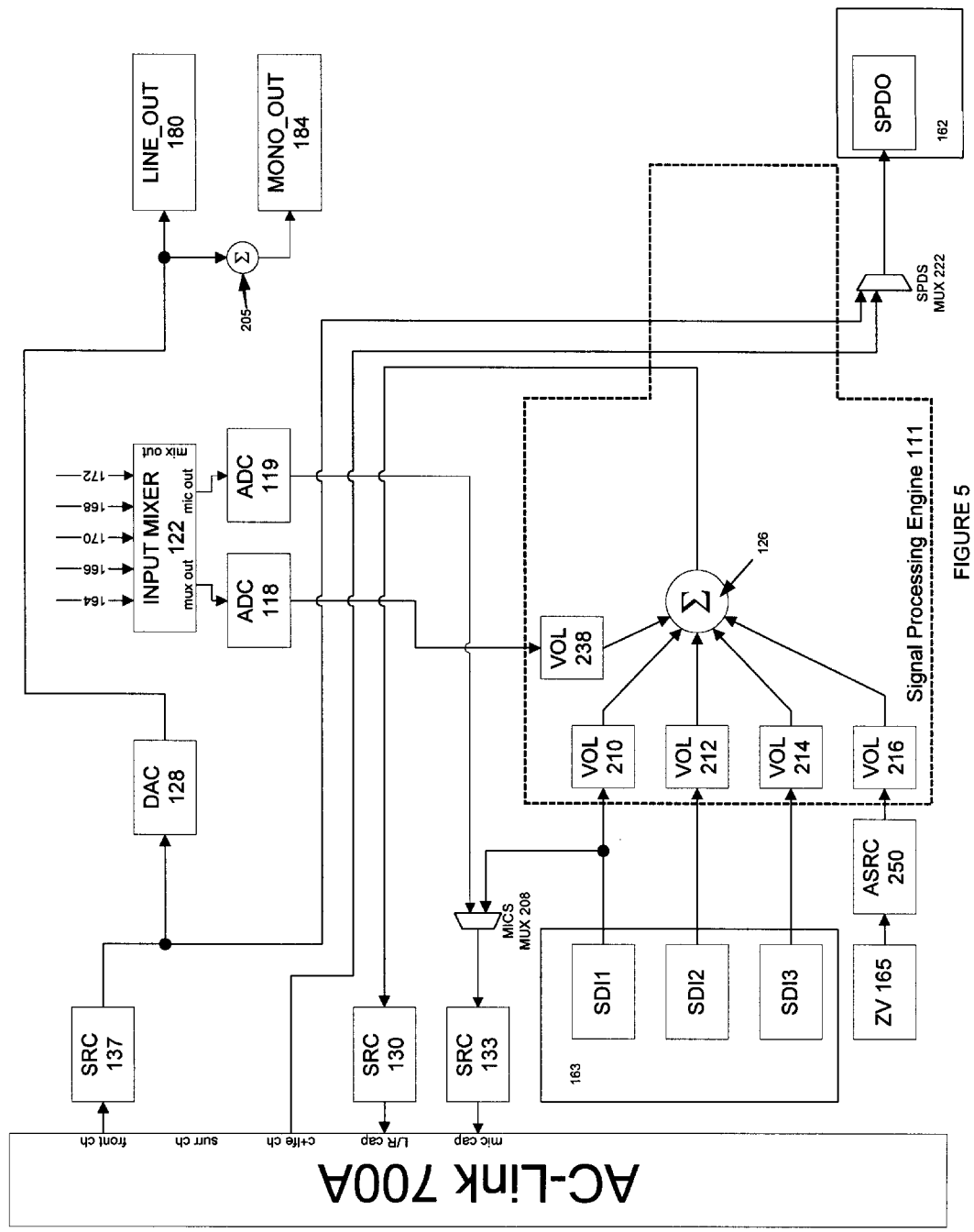
FIG. 5 is an exemplary block diagram of the digital signal routing for the codec of FIG. 1 according to the present invention operating in the host processing mode.

Referring now to FIG. 5, an exemplary block diagram of the digital signal routing for audio codec 100 operating in the host processing mode is shown. The host processing mode is similar to the digital centric mode with the exception of the output signal of digital output mixer 126 being captured by a host processor. The host processor, in turn, processes (e.g., mixes and adds digital effects) the output signal of digital output mixer 126 instead of audio codec 100. The processed signal from the host processor is sent back to audio codec 100 via DAC 128.

Input mixer 122 first mixes together analog signals from LINE pins 164, CD audio input pins 166, AUX input pins 168, VIDEO audio input pins 170, and a primary microphone ("MIC1") pin 172. Input mixer 122 outputs a mixed analog signal (as the data output signal) through Mux Out. The mixed analog signal is fed into ADC block 118, which converts the mixed analog signal to a converted digital signal. The converted digital signal is fed into VOL 228. Digital output mixer 126 mixes the signals from serial data input SDI1, SDI2, and SDI3 pins, ZV input port 165 via ASRC 250, and ADC block 118 transmitted through respective VOLs 210, 212, 214, 216, and 228. These digital signals are otherwise generally unavailable as analog signals to the codec unless additional conversions are performed. Output mixer 126 outputs a mixed digital signal into SRC 130 (via selection of CAPS MUX 206 of FIG. 2). SRC 130 sample-rate converts the output of digital output mixer 126 into a sample-rate converted output signal, and the sample-rate-converted output of SRC 130 is fed into L/R Cap of AC-link 700A.

Microphone data output signal (e.g., through "Mic Out") from input mixer 122 is fed into ADC block 119. ADC block 119 converts the analog signal into a respective converted digital signal. The output of ADC block 119 is fed into an input of MICS MUX 208. The output signal from SDI1 pin is fed into another input of MICS MUX 208. MICS MUX 208 is controlled to select between the signal from SDI1 pin and the output signal from ADC block 119 as the signal to be sample rate converted by SRC 133. The sample-rate converted output of SRC 133 is fed into Mic Cap of AC-link 700A.

SRC 137 receives the signal from Front Ch and sample rate converts the Front Ch signal. The output of SRC 137 is sent to DAC 128 and to SPDS MUX 222. The output of DAC 128 by-passes input mixer 122 and is directly input into LINE_OUT pins 180 and into a summing stage 205 (e.g., via DDM MUX 204 selecting the output of DAC 128 in the DAC direct mode). The output of summing stage 205 is, in turn, fed into MONO_OUT pin 184. SPDS MUX 222 receives inputs from the output of SRC 137 and the signal from C+LFE CH. SPDS MUX 222 selects among these signals as the signal to output to pin 162 when pin 162 is configured as a SPDO or S/PDIF OUT pin.

Figure 6:
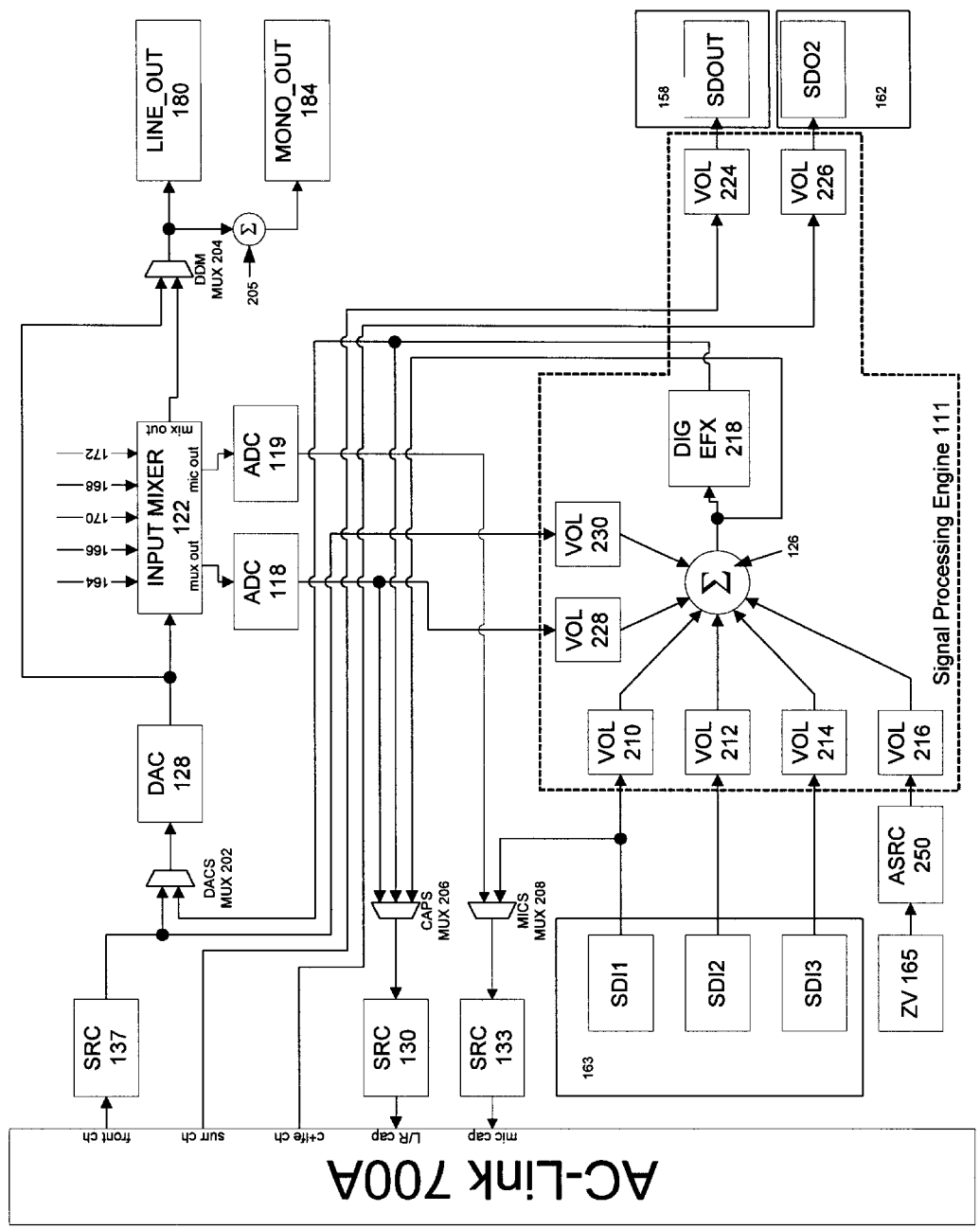
FIG. 6 is an exemplary block diagram of the digital signal routing for the codec of FIG. 1 according to the present invention operating in the multi-channel mode.

With reference now to FIG. 6, an exemplary block diagram of the digital signal routing for audio codec 100 operating in the multi-channel mode is shown. The multi-channel mode is an extension of any of the other three modes (e.g., analog centric mode, digital centric mode, or host processing mode). The distinguishing feature of the multi-channel mode is that one or more additional slot pairs is/are routed to serial data output port (e.g., additional exemplary serial data output pin, which is shown as SDO2 pin 162, which may be an I²S OUT2 pin). The multi-channel mode allows audio codec 100, which may be an AC '97 codec, to provide a complete multi-channel solution with the use of only one or two external DACs.

SRC 137 is coupled to Front Ch of AC-link 700A. The output of SRC 137 is fed into DACS MUX 202 and VOL 230. Another input of DACS MUX 202 receives the output signal from digital effects processor ("DIG EFX") 218. DACS MUX 202 selects between the digital signal from either SRC 137 or DIG EFX 218. The output from DACS MUX 202 is fed into the input of DAC 128. DAC 128 converts the selected digital signal to a respective analog signal. The analog signal output from DAC 128 may be fed into input mixer 122. Input mixer 122 mixes the analog signal output with signals from LINE pins 164, CD audio input pins 166, AUX input pins 168, VIDEO audio input pins 170, and a primary microphone ("MIC1") pin 172 (e.g., DDM MUX 204 selecting the output of input mixer 122 for the non-DAC direct mode). Alternatively, the analog signal output may by-pass input mixer 122 and be fed directly into DDM MUX 204 (e.g., DDM MUX 204 selecting the output of DAC 128 for the DAC direct mode). The output of input mixer 122 is also fed into DDM MUX 204. The output of DDM MUX 204 is fed into LINE_OUT pins 180 and to a summing stage 205. The output of summing stage 205 is, in turn, fed into MONO_OUT pin 184.

Data output signal (through "Mux Out") from input mixer 122 is directed into ADC block 118, and microphone data output signal (through "Mic Out") from input mixer 122 is fed into ADC block 119. ADC blocks 118 and 119 convert the respective analog signals into converted digital signals. The output of ADC block 118 is fed into VOL 228 in signal processing engine 111 and into one of the inputs of CAPS MUX 206. Another input of CAPS MUX 206 receives the signal from the DIG EFX 218, and a further input of CAPS MUX 206 receives a signal from output mixer 126. CAPS MUX 206 is controlled to select between the output of ADC block 118, the signal from DIG EFX 218, and the signal from output mixer 126 as the digital signal to be sample rate converted by SRC 130. The output of CAPS MUX 206 is directed into the input of SRC 130. SRC 130 sample-rate converts the selected digital signal, and the sample-rate-converted output of SRC 130 is fed into L/R Cap of AC-link 700A.

The output of ADC block 119 is fed into an input of MICS MUX 208. The output signal from SDI1 pin is fed into another input of MICS MUX 208. MICS MUX 208 is controlled to select between the signal from SDI1 pin and the output signal from ADC block 119 as the signal to be sample rate converted by SRC 133. The sample-rate converted output of SRC 133 is fed into Mic Cap of AC-link 700A.

Serial data input SDI1, SDI2, and SDI3 pins are fed into respective VOLs 210, 212, and 214 of signal processing engine 111. Also, ZV input port 165 is coupled to ASRC 250 to asynchronously sample rate convert the signal from ZV input port 165 to a different rate. The output of ASRC 250 is fed into VOL 216. The outputs from VOLs 210, 212, 214, 216, 228, and 230 are fed into output mixer 126 and mixed thereat. Output mixer 126 provides a digitally mixed output signal, and the digitally mixed output signal is directed into DIG EFX 218. The digitally mixed output signal is also sent to DACS MUX 202. DIG EFX 218 processes the digitally mixed output signal to add digital effects thereto. The output of DIG EFX 218 is fed into CAPS MUX 206 and DACS MUX 202. The output of Surr Ch is fed into VOL 224, and VOL 224, in turn, provides an amplified output signal to SDOUT pin 158. The output of C+LFE CH is input into VOL 226. The amplified signal from VOL 226 is directed to pin 162 when pin 162 is configured to operate as the serial data output pin (e.g., SDO2 pin 162, which may be an I²S OUT2 pin).

FIGS. 7A and 7B show configurations as to audio codec 100 being implemented in the primary and secondary modes. Referring now to FIG. 7A, a single audio codec 100 is configured in the primary or master mode and is linked to an audio codec controller 702 through an AC-link 700A. AC-link 700A is a point-to-point connection between audio codec controller 702 and primary audio codec 100. AC-link 700A connects together SYNC pins 144, BIT_CLK pins 146, SDATA_OUT pins 148, SDATA_IN pins 150, and RESET# pins 152 of audio codec controller 702 and primary audio codec 100. In the configuration of FIG. 7A, audio codec 100 may be operated in any one of the four modes mentioned above.

With reference now to FIG. 7B, multiple audio codecs 100A, 100B . . . 100D are coupled to an audio codec controller 704 through an AC-link 700B. Audio codec 100A is configured to operate in a primary or master mode while audio codecs 100B . . . 100D are configured to operate in the secondary or slave modes. Primary audio codec 100A therefore drives slave audio codecs 100B . . . 100D. AC-link 700B is a point-to-point connection between audio codec controller 704 and primary audio codec 100A. AC-link 700B connects together SYNC pins 144, BIT_CLK pins 146, SDATA_OUT pins 148, and RESET# pins 152 of audio codec controller 704 and primary audio codec 100A. AC-link 700B further connects in a point-to-point manner SDATA_IN pin 150A of audio codec controller 704 and SDATA_IN pin 150 of primary audio codec 100A. Secondary audio codecs 100B . . . 100D are further coupled to AC-link 700B at the points which connect SYNC pins 144, BIT_CLK pins 146, SDATA_OUT pins 148, and RESET# pins 152 of audio codec controller 704, primary audio codec 100A, and secondary audio codecs 100B . . . 100D. Secondary audio codecs 100B . . . 100D are additionally coupled to audio codec controller 704 by connecting SDATA_IN pins 150 of secondary audio codecs 100B . . . 100D with respective SDATA_IN1 pin 150B, SDATA_IN2 pin 150C, SDATA_IN3 pin 150D of audio codec controller 704. In the configuration of FIG. 7B, audio codecs 100A . . . 100D may each be operated in any one of the four modes mentioned above.

Figure 8:
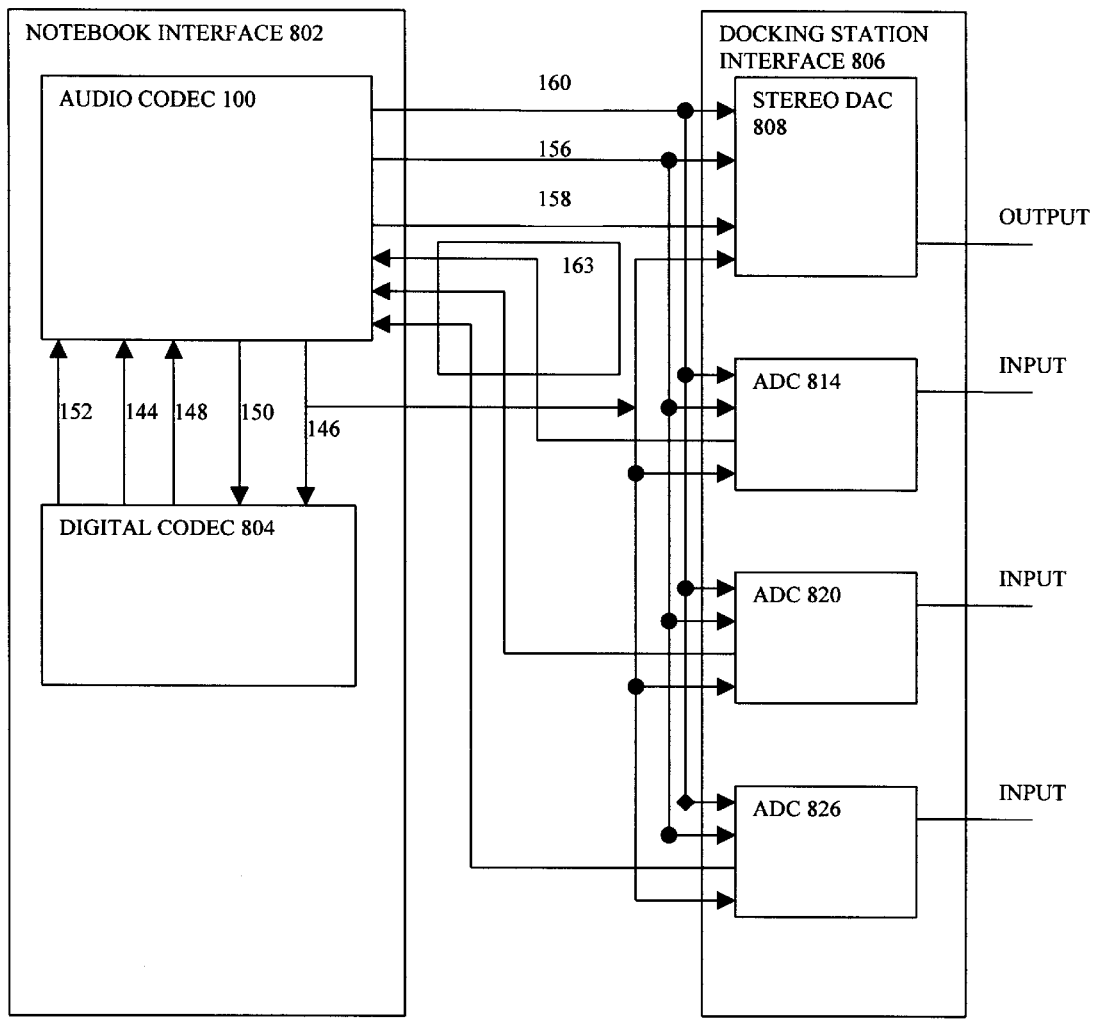
FIG. 8 is an exemplary block diagram of the interface connection between a notebook computer and a digital docking station in which the notebook computer has an audio card that incorporates the codec of FIG. 1 according to the present invention.

Referring now to FIG. 8, an exemplary block diagram of the interface connection between a notebook computer and a digital docking station is shown. The notebook computer has an audio card that incorporates audio codec 100 according to the present invention. The block diagram of FIG. 8 shows notebook interface 802 coupled to docking station interface 806.

Notebook interface 802 includes audio codec 100 coupled to a digital codec 804 via connections to RESET# pin 152, SYNC pin 144, SDATA_OUT pin 148, SDATA_IN pin 150, and BIT_CLK pin 146. Docking station interface 806 consists of stereo DAC 808 and ADCs 814, 820, and 826. DAC 808 provides a converted analog signal from a digital signal, and each of ADCs 814, 820, and 826 provides a converted digital signal from an analog source. DAC 808 has an output port, and each of ADCs 814, 820, and 826 has an input port. Audio codec 100 is coupled to stereo DAC 808, and each of ADCs 814, 820, and 826 via connections to EAPD/SCLK pin 160, GPIO0/LRCLK pin 156, GPIO1/SDOUT pin 158, and GPIO[2:4]/SDI[1:3] pins 163. The signals at pins 163 are the serial data output signals (e.g., digital signals converted from analog signals at the docking station) from respective stereo DAC 808 and ADCs 814, 820, and 826. These serial data output signals are the digital signals that are otherwise generally unavailable as analog signals to audio codec 100 in the notebook computer unless additional conversions are performed since they exist as digital signals at docking station interface 806. Exemplary digital signals from stereo DAC 808 and ADCs 814, 820, and 826 generated from the docking station may be a microphone signal, an audio line signal, a CD signal, etc. Audio codec 100 is operated in the digital centric mode in order to process the signals according to the present invention.

Figure 9:
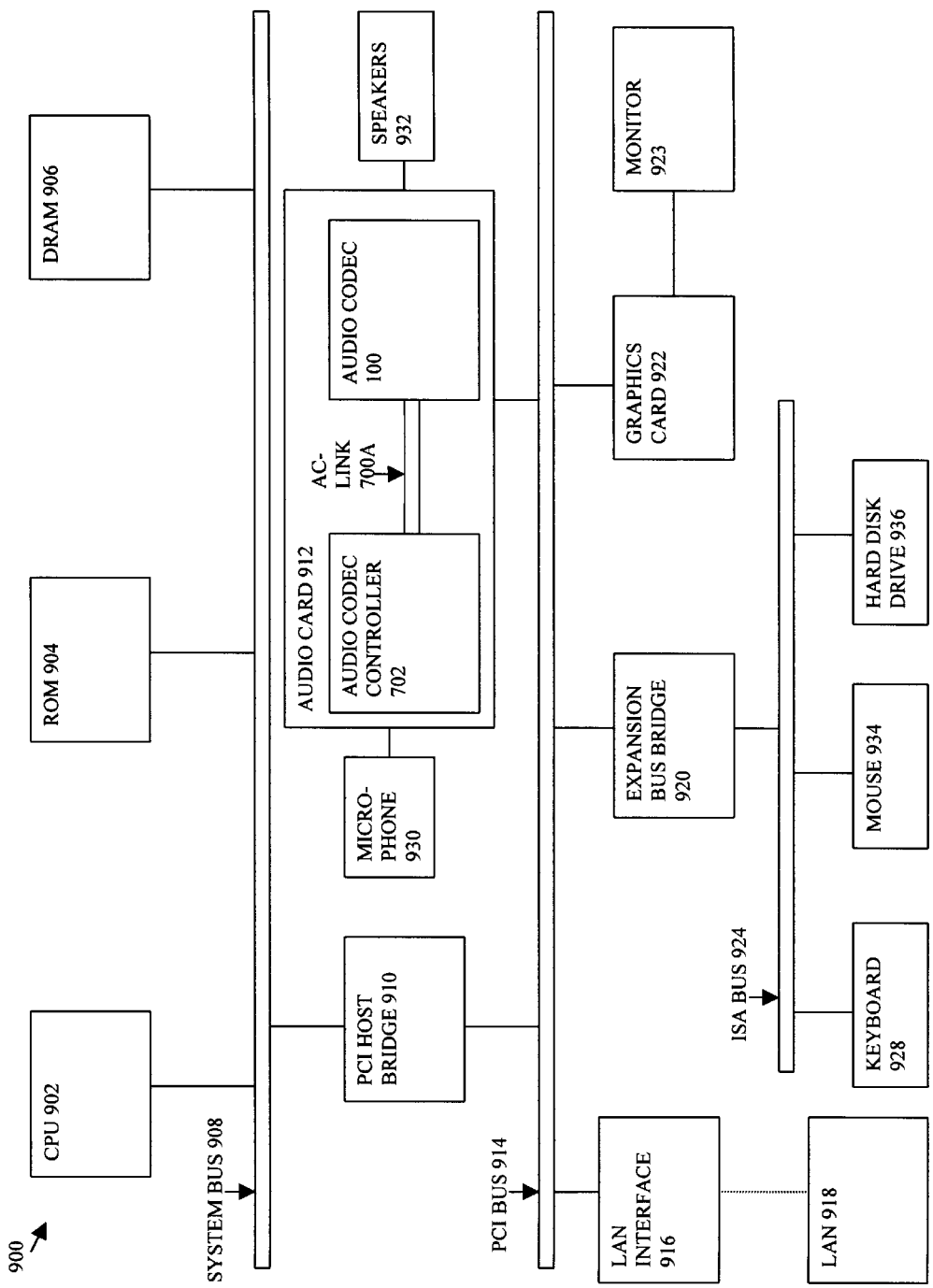
FIG. 9 is an exemplary block diagram of a computer system that has an audio card comprising and implementing the codec of FIG. 1 according to the present invention.

With reference now to FIG. 9, a typical computer system 900, which may be utilized in conjunction with a preferred embodiment of the present invention, is depicted. As shown, a central processing unit ("CPU") 902, a read only memory ("ROM") 904, a dynamic random access memory ("DRAM") 906 are connected to a system bus 908 of computer system 900. CPU 902, ROM 904, and DRAM 906 are also coupled to a PCI local bus 914 of computer system 900 through a PCI host bridge 910. PCI host bridge 910 provides a low latency path through which CPU 902 may directly access PCI devices mapped anywhere within bus memory and/or input/output ("I/O") address spaces. PCI host bridge 910 also provides a high bandwidth path allowing PCI devices to directly access DRAM 906.

In addition, an audio card 912 is attached to PCI local bus 914 for receiving audio input, such as from a microphone 930, and controlling audio output to speakers 932. Audio card 912 contains audio codec 100 may be operated in any one of the four modes according to the present invention, and audio codec 100 is coupled to audio codec controller 702 via AC-link 700A. A graphics card 922 is attached to PCI local bus 914 for controlling visual output to a monitor 923. A local area network ("LAN") interface adapter 916 is coupled to PCI local bus 914. LAN interface adapter 916 is utilized for connecting computer system 900 to a LAN 918. A PCI-to-Industry Standard Architecture ("ISA") bus bridge, such as expansion bus bridge 920, may be utilized for coupling an ISA bus 924 to PCI local bus 914. A keyboard 928, a mouse 934, and a hard disk drive 936 are attached to ISA bus 924 for performing basic I/O functions. Although the illustrated exemplary embodiment describes a PCI local bus 914 and an ISA bus 924, the present invention is not limited to the particular bus architectures. Rather, the present invention can be utilized in any bus system having other bus architectures.

In summary, the present invention discloses a system and method of operating audio codec 100 in an operational mode. Audio codec 100 is operated in a digital centric mode. Operation in the digital centric mode involves the following: An analog input mixer 122 first mixes analog signals, if any, to produce a mixed analog signal. ADC 118 converts the mixed analog signal into a converted digital signal. Digital input mixer 126 mixes the converted digital signal with digital signals that are otherwise generally unavailable as analog signals to audio codec 100 unless further conversions are performed to produce a mixed digital signal. DAC 128 converts the mixed digital signal into a mixed analog signal. DIG EFX 218 may perform digital effects processing on the mixed digital signal to add digital effects to the mixed digital signal. Audio codec 100 is still able to alternatively operate in an analog centric mode, a host processing mode, or a multi-channel mode.

The present invention provides a codec that receives and processes digital signals, which relate to the audio source signals without having to perform any additional conversions. The present invention avoids the use of additional DACs, which would otherwise add to the overall size, cost, noise and distortion of an audio circuit. The present invention also provides a codec that is able to add digital effects to the analog signals that would otherwise not have the digital effects so that the output reflects what is being recorded or played back when digital effects have been added to the digital signals and, in effect, to the analog signals as well.

While the invention has been particularly shown and described with reference to a preferred embodiment, it will be understood by those skilled in the art that various changes in form and detail may be made therein without departing from the spirit and scope of the invention.

What is claimed is:

1. A method of operating a codec, comprising:
   operating the codec in a digital centric mode by:
      first mixing, by an analog mixer of the codec, analog signals, if any, to produce a mixed analog signal and converting, by an analog-to-digital converter, the mixed analog signal into a converted digital signal;
      mixing, by a digital mixer of the codec, the converted digital signal with digital signals that are otherwise generally unavailable as analog signals to the codec to produce a mixed digital signal;
      converting, by a digital-to-analog converter of the codec, the mixed digital signal into a mixed analog signal; and
      performing digital effects processing on the mixed digital signal to add digital effects to the mixed digital signal.

2. The method according to claim 1, wherein the digital effects are, in effect, able to be added to the digital signals when the digital effects are otherwise generally not available to be added to the digital signals by the codec operating in an analog centric mode.

3. The method according to claim 1, further comprising:
   alternatively operating the codec in an analog centric mode by:
      first pre-mixing, by the digital mixer, the digital signals and outputting, by the digital mixer, a pre-mixed digital signal;
      converting, by the digital-to-analog converter, the pre-mixed digital signal into another convened analog signal; and
      mixing, by the analog mixer, the another converted analog signal with the analog signals, if any, and outputting, by the analog mixer, another mixed analog signal.

4. The method according to claim 1, further comprising:
   alternatively operating the codec in a host processing mode by:
      capturing and further processing, by a host processor, the mixed digital signal;
      providing, by the host processor, the host-processed digital signal to the digital-to-analog converter; and
      converting, by the digital-to-analog converter, the host-processed digital signal into a host-processed analog signal.

5. The method according to claim 1, wherein the digital mixed signal is converted into a plurality of mixed digital mixed signals and further comprising:
   alternatively operating the codec in a multi-channel mode by:
      outputting, by the codec, the plurality of mixed digital signals through multiple channels.

6. A codec for coding and decoding signals, comprising:
   a clock generator system for generating and operating a codec with a clock signal;

a digital interface block having at least registers and a codec link interface for coupling to a codec controller wherein the clock generator system is coupled to the digital interface block;

a digital input/output interface block for digitally interfacing with input and output devices wherein the digital input/output interface block is coupled to the digital interface block;

an analog interface block having at least an analog-to-digital converter, an input multiplexer, an analog mixer, a digital mixer, and a digital-to-analog converter wherein the analog interface block is coupled to the digital interface block; and a sample rate conversion system coupled between the digital interface block and the analog interface block to convert between respective sample rates of the digital interface block and the analog interface block; and wherein the codec is operating in a digital centric mode by the analog mixer first mixing analog signals, if any, to produce a mixed analog signal; the analog-to-digital converter converting the mixed analog signal into a converted digital signal; the digital mixer mixing the converted digital signal with digital signals that are otherwise generally unavailable as analog signals to the codec to produce a mixed digital signal; and the digital-to-analog converter of the codec converting the mixed digital signal into a mixed analog signal.

7. The cadet according to claim 6, further comprising:

a digital processor for performing digital effects processing on the mixed digital signal to add digital effects to the mixed digital signal.

8. The codec according to claim 7, wherein the digital effects are, in effect, able to be added to the digital signals when the digital effects are otherwise generally not available to be added to the digital signals by the codec operating in an analog centric mode.

9. The codec according to claim 6, wherein:

the codec alternatively operates in an analog centric mode by the digital mixer first pre-mixing the digital signals and outputting a pre-mixed digital signal; the digital-to-analog converter converting the pre-mixed digital signal into another converted analog signal; and the analog mixer mixing the another converted analog signal with the analog signals, if any, and outputting another mixed analog signal.

10. The codec according to claim 6, wherein:

the codec alternatively operates in a host processing mode by a host processor capturing and further processing the mixed digital signal; the host processor providing the host-processed digital signal to the digital-to-analog converter; and the digital-to-analog converter converting the host-processed digital signal into a host-processed analog signal.

11. The codec according to claim 6, wherein the digital mixed signal is converted into a plurality of mixed digital mixed signals and wherein:

the codec alternatively operates in a multi-channel mode by the codec outputting the plurality of mixed digital signals through multiple channels.

12. An audio system, comprising:

an audio codec that includes:

a clock generator system for generating and operating a codec with a clock signal;

a digital interface block having at least registers and a codec link interface for coupling to a codec controller wherein the clock generator system is coupled to the digital interface block;

a digital input/output interface block for digitally interfacing with input and output devices wherein the digital input/output interface block is coupled to the digital interface block;

an analog interface block having at least an analog-to-digital converter, an input multiplexer, an analog mixer, a digital mixer, and a digital-to-analog converter wherein the analog interface block is coupled to the digital interface block; and a sample rate conversion system coupled between the digital interface block and the analog interface block to convert between respective sample rates of the digital interface block and the analog interface block; and an audio codec link coupled to the audio codec;

an audio codec controller coupled to the audio codec link wherein the audio codec controller controls operation of the audio codec;

a system bus coupled to the audio codec controller and a central processing unit and bus sources coupled to the system bus;

wherein the audio codec is operating in a digital centric mode by the analog mixer first mixing analog signals, if any, to produce a mixed analog signal; the analog-to-digital converter converting the mixed analog signal into a converted digital signal; the digital mixer mixing the converted digital signal with digital signals that are otherwise generally unavailable as analog signals to the audio codec to produce a mixed digital signal; and the digital-to-analog converter of the audio codec converting the mixed digital signal into a mixed analog signal.

13. The audio system according to claim 12, wherein the audio codec further comprises:

a digital processor for performing digital effects processing on the mixed digital signal to add digital effects to the mixed digital signal.

14. The audio system according to claim 13, wherein the digital effects are, in effect, able to be added to the digital signals when the digital effects are otherwise generally not available to be added to the digital signals by the audio codec operating in an analog centric mode.

15. The audio system according to claim 12, wherein:

the audio cadet alternatively operates in an analog centric mode by the digital mixer first pre-mixing the digital signals and outputting a pre-mixed digital signal; the digital-to-analog converter converting the pre-mixed digital signal into another converted analog signal; and the analog mixer mixing the another converted analog signal with the analog signals, if any, and outputting another mixed analog signal.

16. The audio system according to claim 12, wherein:

the audio codec alternatively operates in a host processing mode by the central processing unit capturing and further processing the mixed digital signal; the central processing unit providing the host-processed digital signal to the digital-to-analog converter; and the digital-to-analog converter converting the host-processed digital signal into a host-processed analog signal.

17. The audio system according to claim 12, wherein the digital mixed signal is converted into a plurality of mixed digital mixed signals and wherein:

the audio codec alternatively operates in a multi-channel mode by the audio codec outputting the plurality of mixed digital signals through multiple channels.

* * * * *